United States Patent Office 3,140,855
Patented July 14, 1964

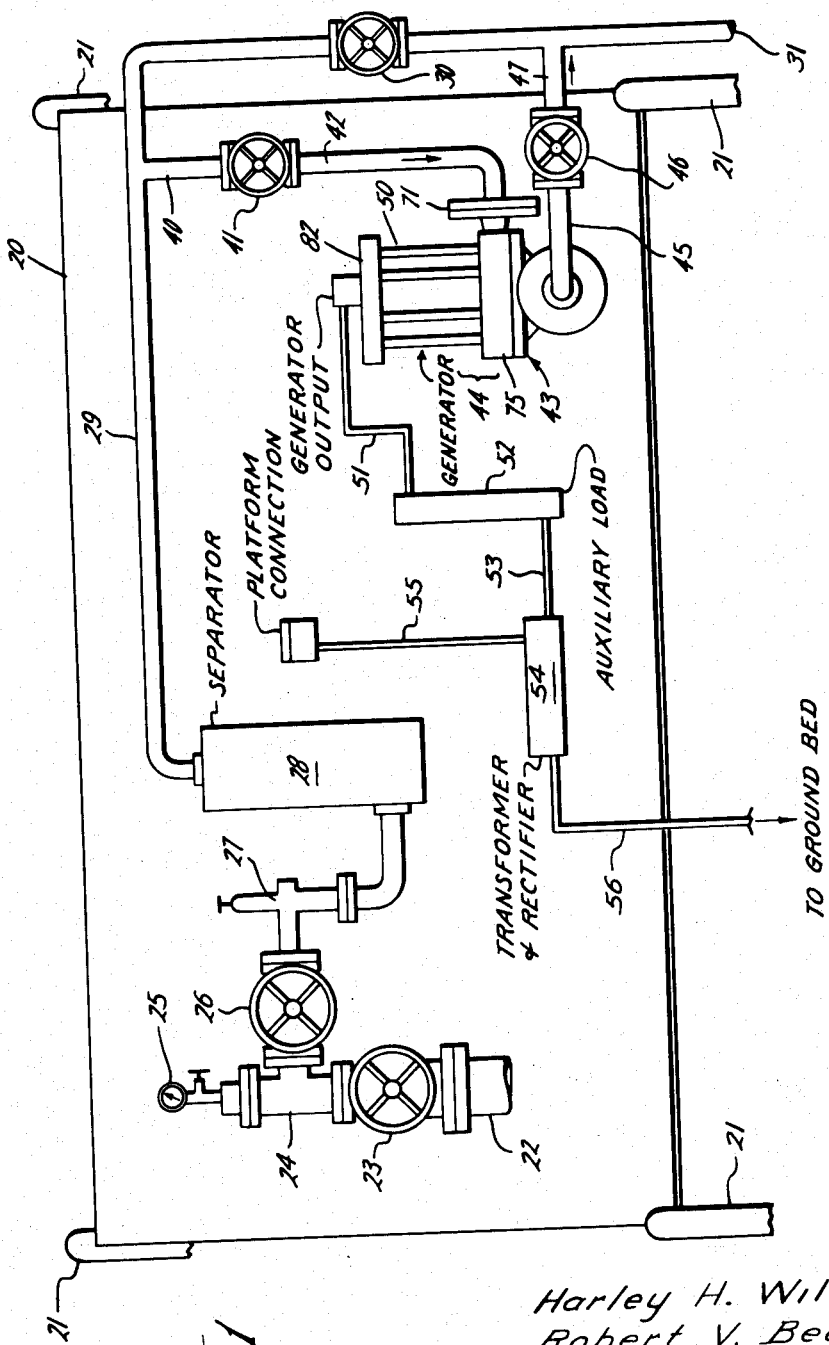

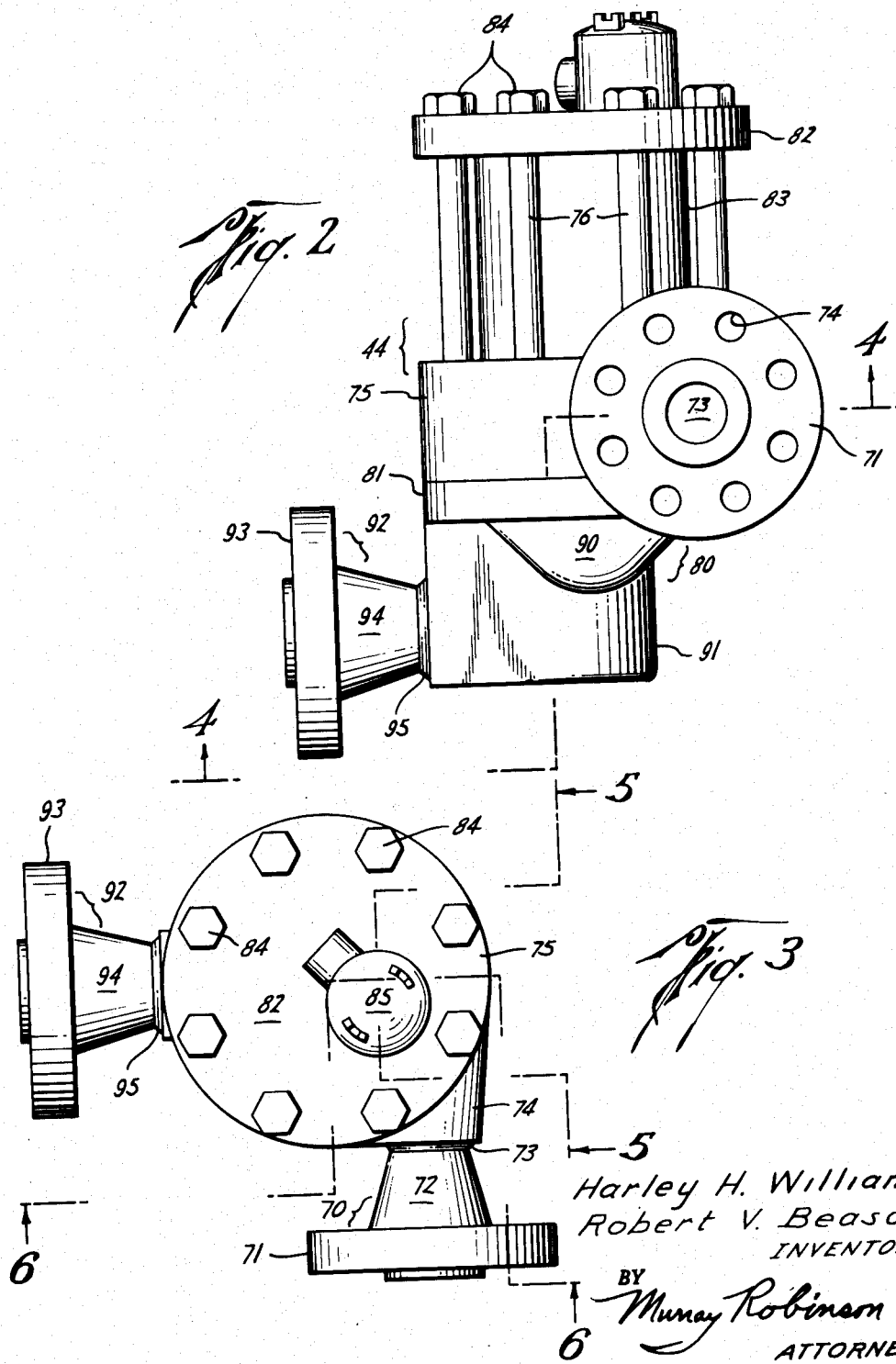

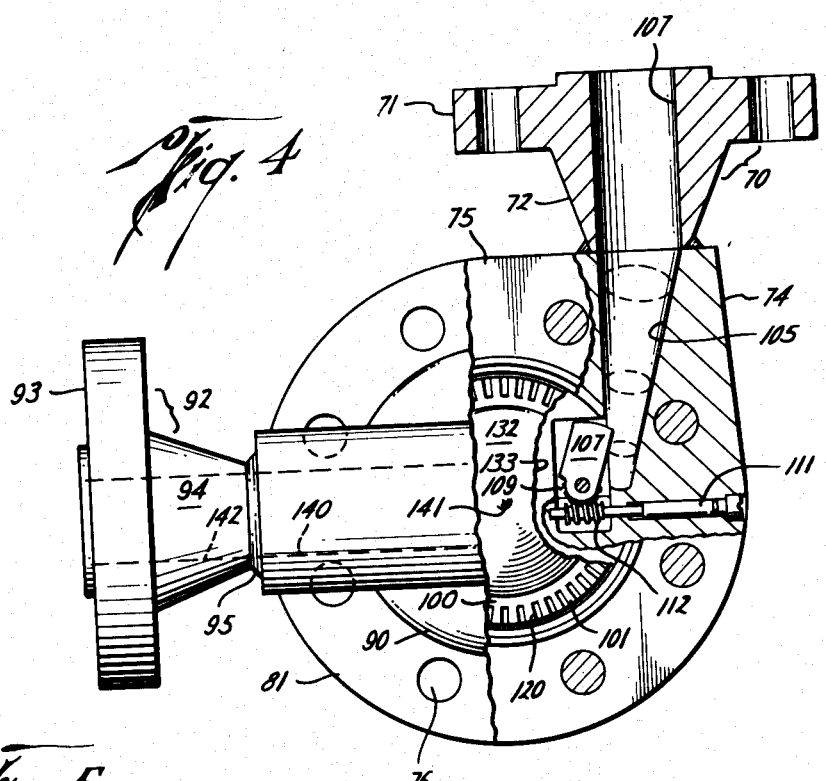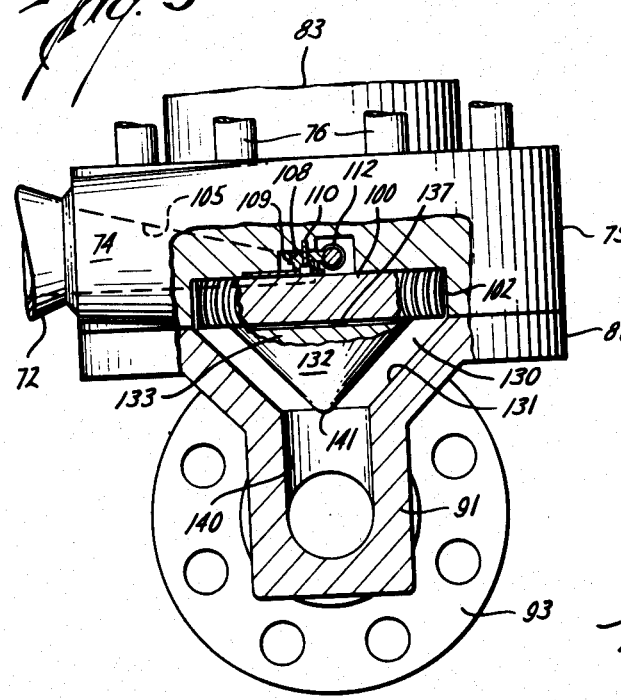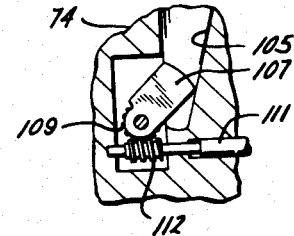

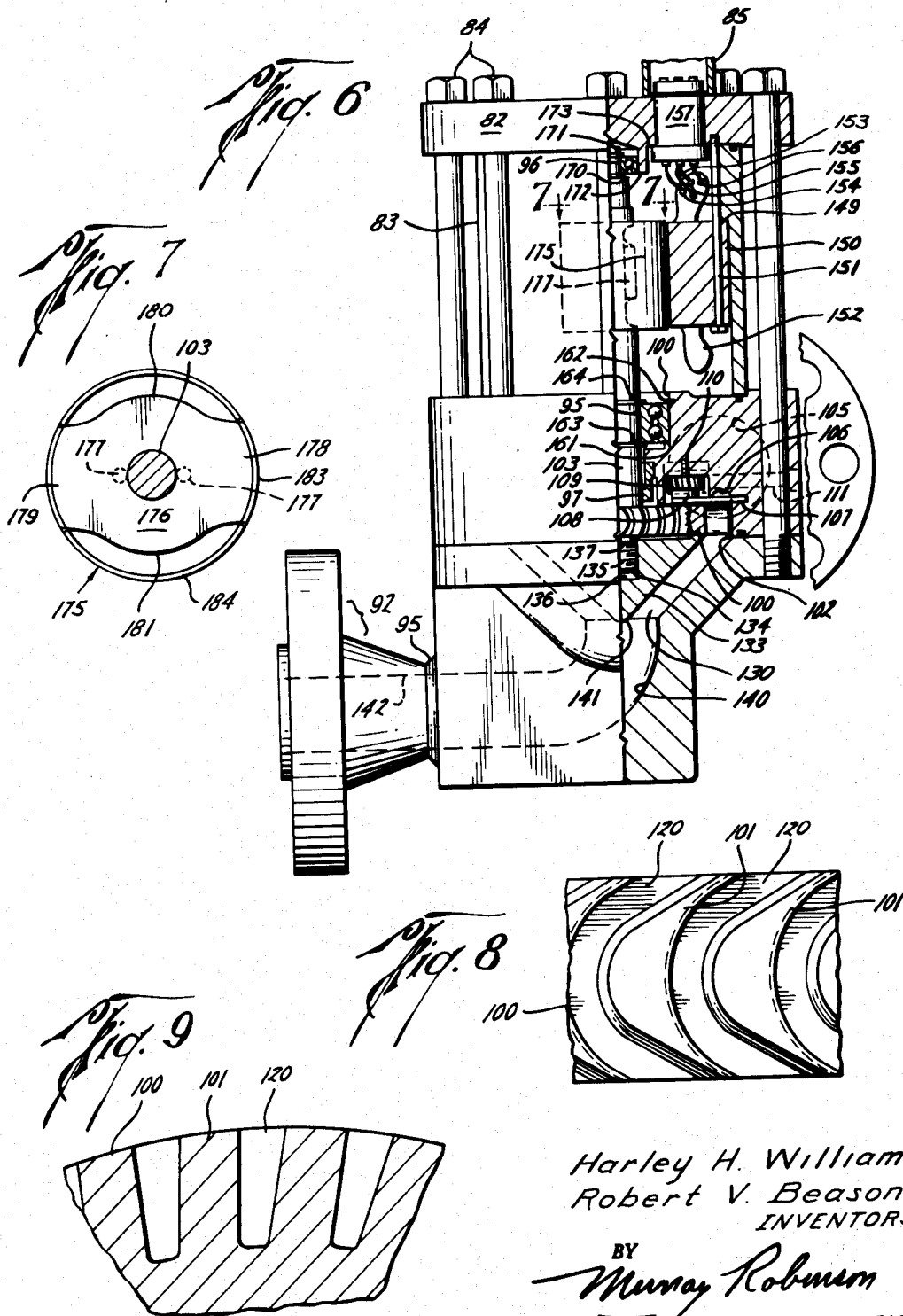

3,140,855
CATHODIC PROTECTION OF PIPE LINES AND INLINE TURBO GENERATOR THEREFOR

Harley H. Williams and Robert V. Beason, Houston, Tex., assignors to Well Electronic Supply Co., a corporation of Texas
Filed June 26, 1961, Ser. No. 131,951
1 Claim. (Cl. 253—141)

This invention pertains to turbines, and more particularly to a natural gas powered turbo generator and to a system of cathodic protection for gas well pipes.

The principal object of the invention is to provide a turbine for driving an electric generator, the turbine being powered by natural gas taken from a pressurized gas line and returning thereto at nearly the same pressure.

Such a turbine is particularly useful for driving an electric generator at an offshore gas well for supplying the small power requirements needed for cathodic protection of the well. The electric power so generated may also be used to operate remote control and metering equipment, or a radio transmitter As compared to turbines venting to atmosphere, the present invention has the advantages of elimination of loss of the vented gas and the ability to operate at lower speeds. Compared to internal combustion engines there is the advantage of greater reliability without constant maintenance, eliminating the need for standby equipment, and the ability to operate with lower purity gas, eliminating the need for special scrubbers. Internal combustion engines also present a fire hazard as do thermopile generators using a gas flame, another power source that has been tried.

Great difficulty was experienced in providing a turbine that would provide any power output at all under the specified conditions of low pressure drop across the turbine compared to the high back pressure. For example with an input pressure of 1000 p.s.i. and a drop of 30 p.s.i. the back pressure would be 970 p.s.i. Conventional turbines would not operate under these conditions, all the power being consumed in turbulence.

Another difficulty encountered was the wide range of operating pressures and gas volumes available at different wells. To be commercially acceptable, the turbine must be capable of operation on whatever pressure and gas volume is available at the well and in the gas line.

According to the invention there is provided a single stage axial flow turbine having a constant area cross section through the rotor and having an adjustable inlet orifice directly adjacent the rotor and having a conical annular outlet chamber coaxial with the rotor and circumferentially coextensive therewith.

For a detailed description of a preferred embodiment of the invention reference will now be made to the accompanying drawings wherein FIGURE 1 is a schematic pictorial view of a well head platform showing a system of cathodic protection embodying the invention and incorporating a turbo generator in accordance with the invention;

FIGURE 2 is an elevation of the turbo generator taken from the right side thereof as viewed in FIGURE 1;

FIGURE 3 is a plan view of the turbo generator shown in FIGURE 2;

FIGURE 4 is a bottom view of the turbo generator, partly in section along line 4—4 of FIGURE 2;

FIGURE 4A is a fragmentary view of the inlet valve of the turbo generator similar to FIGURE 4 except showing the valve in closed position;

FIGURE 5 is a rear elevation, partly in section, taken on line 5—5 of FIGURE 3;

FIGURE 6 is a right side elevation similar to FIGURE 2 but partly in section along line 6—6 of FIGURE 3;

FIGURE 7 is a top view of the end of the generator rotor, taken on line 7—7 of FIGURE 6;

FIGURE 8 is a development of the blade arrangement of the turbine rotor; and

FIGURE 9 is a section taken on line 9—9 of FIGURE 8.

Referring now to FIGURE 1 there is shown a well head platform 20 supported by piles 21 extending into the ground (or in the case of an over water platform into the bottom of the body of water). Well head 22 extends from the well up above the platform. Master valve 23 on top of the well head controls flow from the well. A toe 24 on top of the master valve connects to a pressure gage 25 and a wing valve 26. An adjustable choke 27 is connected to the wing valve and the outlet of the choke is connected to separator 28. A gas line commencing with pipe 29 extends from the top of the separator to adjustable restricting valve 30 and continues on with pipe 31 connected to the downstream side of the valve 30 leading to the first compressor station of a gas transmission line.

Around the restricting valve 30 extends a by-pass line including pipe 40, cutoff valve 41, pipe 42, the turbine 43 of turbo generator 44, pipe 45, cutoff valve 46, and pipe 47.

Generator 50 of the turbo generator is connected by cable 51 to the various auxiliaries such as radio transmitter and receiver, remote metering and control equipment which together constitute the load indicated schematically at 52. One portion of this load is depicted in detail as including cable 53, and transformer rectifier 54, the direct current output of the latter being supplied by cables 55 and 56 to the platform electrical connection 57 and the ground respectively. If generator 50 is a direct current generator instead of an alternating current generator, the transformer rectifier 52 can be omitted. The D.C. voltage provides cathodic protection for the well head platform and all the equipment connected thereto including the gas pipe line 29–30–31. Power from the gas in the pipe line is thus used for protection of the gas pipe line itself.

Referring now to FIGURES 2 and 3, the turbo generator 44 includes an inlet coupling 70 having a flange 71 and a tapered nipple 72. There is an inlet passage 73 through the coupling and bolt holes 74 in the periphery of the flange. The nipple 72 is welded at 73 to boss 74 at one side of a generally cylindrical body 75 which forms the turbine stator and housing and one end of the generator stator and housing. An outlet cover 80 is secured to the bottom of the body 75 by through-bolts 76 which extend through peripheral holes in the body 75 into threaded holes in the flange 81 of cover 80. The bolts 76 extend on the top side of body 75 through top plate 82 and clamp generator stator housing 83 between plate 82 and body 75. The heads of the bolts are indicated at 84. There is an opening 85 in top plate 82 for the generator electrical connections. Turbine outlet cover 80 also includes a conical portion 90 and a box shaped boss 91 through which there is an outlet passage for gas from the turbine. An outlet coupling 92 includes a flange 93 and a tapered nipple 94, the latter being welded to boss 91 at 95.

Referring now to FIGURES 4–6 there is shown turbine rotor 100 having a plurality of blades 101 formed in its outer periphery. The rotor 100 is disposed in a cylindrical aperture 102 in body 75 and is keyed to shaft 103 rotatably mounted in ball bearing 95 in body 75 and ball bearing 96 secured to top plate 82. A packing 97 seals shaft 103 to body 75.

Gas is admitted to aperture 102 adjacent rotor 100 through passage 104 in the inlet coupling nozzle 105 in boss 74 and body 75. Nozzle 105 terminates in orifice 106 adjacent rotor 100. A valve plate 107 is welded to a disc 108 secured to the side of a worm wheel 109, the wheel being rotatably mounted on stud 110. The plate is adjustably positioned between the rotor and orifice to control gas flow through the orifice to the rotor. Adjustment of position of the valve plate is accomplished by turning adjusting screw 111 which extends through a hole in body 75, the screw having a worm 112 on its inner end engaging worm wheel 109, and having a socket 113 on its outer end for engagement with an adjustment wrench.

As shown by FIGURE 4A wherein plate 107 is adjusted for maximum flow restriction the travel of plate 107 is not sufficient to permit orifice 106 to be completely blocked. This is a matter of design however for the valve plate travel could be increased, if desired, sufficient to fully close the orifice.

Referring again to FIGURES 4-6, after gas has been admitted to space 102 in body 75, it passes through the space 120 between the blades 101 of the turbine rotor 100 and enters the conical annular outlet chamber 130 coaxial with the rotor and having its largest diameter or base portion in register with the bladed portion of the rotor. Outlet chamber 130 is formed exteriorly by the tapered or conical interior 131 of tapered portion 90 of outlet cover 80. Interiorly chamber 130 is formed by the tapered or conical exterior 132 of conical flow director 133 also coaxial with rotor 100 and secured onto the end thereof by means of screw threads 134, 135 in a socket 136 in the flow director and on the end 137 of the turbine shaft 103.

Gas leaves outlet chamber 130 through tubular passageway 140 in boss 91 of the outlet cover. Passageway 140 merges with the small diameter or apex end of chamber 130 and is coaxial therewith. The apex 141 of conical flow director 133 is rounded. Passageway 140 bends after it leaves the apex of chamber 130 and goes to the front side of the boss 91 where it joins coaxially with passage 142 in outlet coupling 92 secured thereto by weld 95.

Referring now particularly to FIGURE 6 generator stator housing 83 has a shoulder 149 therein against which rests generator armature 150. Armature 150 is held against the shoulder by through-bolts 151 screwed into top plate 82. The armature winding 152 is a conventional alternating current synchronous generator winding disposed in slots in the soft iron armature. Preferably the armature winding is a three phase winding and may be lap or wave wound. A Y connection is shown with the four leads 153, 154, 155, 156 connected to terminal plugs 157 secured in the top plate 82 to which cable 51 (FIG. 1) is connected.

Bearing 95 for the rotor shaft 103 is disposed in enlarged opening 160 in body 75, being held against shoulder 161 by snap ring 162 and being secured to shaft 103 by snap rings 103 and 104. Bearing 96 is held against shoulder 170 on shaft 103 by snap ring 171 and is centrally positioned by ring 172 welded at 173 to the bottom of plate 82.

Referring now also to FIGURE 7, the generator rotor 175 includes an Alnico magnet 176 cast in place on shaft 103 and locked against rotation thereon by keys 177 welded to shaft 103. The permanent magnet 176 is magnetized transverse to the shaft 103 to have opposite poles 178, 179 and is cut away at its sides 180, 181 so as to be elongated in cross section from pole to pole. The magnet is disposed within cylindrical casing including soft iron portion 183 over the poles and non-magnetic stainless steel portion 184 adjacent the sides of the magnet. The space between the stainless steel portion 184 of the casing and the sides of the magnet are filled with a non-magnetic material, preferably of light weight, such as an epoxy resin.

The use of a permanent magnetic field for the generator eliminates the need for an external exciter. The permanent magnet is preferably magnetized in situ by connecting a source of direct current across one phase of the armature winding, e.g. between neutral 152 and lead 153. Magnetization in situ produces a stronger residual field than is otherwise obtainable and properly places the field axially in register with the armature winding. The casing of the Alnico supports it against the stresses of centrifugal force which might otherwise cause it to shatter at high speeds.

Referring now to FIGURE 8 it will be seen that the spaces 120 between the rotor blades 101 are of uniform area in cross sectional planes perpendicular to the flow path, that is in planes perpendicular to the sides of the spaces 120. The shape of the cross section appears in FIGURE 9 wherein the flow path is parallel to the rotor axis. There is therefore no expansion of the gas in the rotor nor pressure drop other than that due to any turbulence. To reduce turbulence the rotor blades 101 are curved so that their surfaces adjacent the inlet ends of spaces 120 are more nearly tangent to the axis of inlet nozzle 105 as best shown in FIGURE 6. To reduce turbulence at the outlet the rotor blades are curved so that their surfaces adjacent the outlet are directed opposite to the inlet surfaces of the blades at about the same small angle to the plane of the turbine rotor; the emerging gas thus has almost a zero velocity relative to the stator, just enough to leave through the outlet. The curve of the blades and the rotation thereof impart a circumferential motion to the gas which swirls around in the annular conical outlet chamber 130 until it enters outlet passage 140. The presence of conical flow director 133 prevents turbulence of the gas in the outlet chamber, maintaining nearly laminar flow. With pressure drops due to turbulence reduced to a minimum, a large portion of the pressure drop across the reducing valve 30 is available for conversion into velocity energy in the nozzle 105 which is extracted in the rotor 100. It is by virtue of the reduction of the turbulence, especially through use of flow director cone 133, that it is possible to extract useful energy from the gas despite the small pressure drop across the turbine relative to the back pressure at the outlet.

The adjustable valve plate at the inlet orifice 106 makes possible a variation of the velocity of the gas striking the blades of the turbine rotor and thereby an adjustment of the turbine speed and the generator frequency and voltage. A manual adjustment of the valve plate is shown, this being simple and reliable as is needed for remote locations. It is to be understood however that a governor could be used if precise speed regulation were required. For cathodic protection this is not necessary. It may be noted that despite variation in pressure at the well head, the drop across the reducing valve will remain fairly constant, thereby assuring a certain stability to the speed of the turbine once the valve plate at the inlet has been set. This is a characteristic of a system wherein the turbine is disposed in line with the gas flow from well to user, to be contrasted with the conventional turbine system in which the working fluid exhausts to the constant pressure of the atmosphere or a condenser and variations in inlet pressure would cause variations in the drop across the turbine. A turbine in a system as herein set forth may be called an inline turbine and the turbo generator an inline generator.

By means of the invention using the inline generator there is provided a stable self-sufficient system of cathodic protection not heretofore feasible.

While a preferred embodiment of the invention has been shown and described, many modifications thereof can be made by one skilled in the art without departing from the spirit of the invention and it is desired to protect by Letters Patent all forms of the invention falling within the scope of the following claim.

A gas turbine including a stator having an opening therein, a rotor having a plurality of peripherally disposed radially extending blades, a shaft supporting the rotor and secured thereto, means rotatably supporting the rotor in said stator opening, a nozzle fixed relative to the stator having an inlet and having an outlet orifice adjacent the rotor blades, said nozzle converging from said inlet to said outlet orifice, said nozzle being directed generally toward said rotor blades transverse to the radial extent of the blades, a valve plate between said orifice and said rotor, means for adjusting the position of said valve plate relative to said orifice between positions of more or less obstruction of said orifice, and outlet passage means connected at one end thereof adjacent to said opening in the turbine stator on the opposite side of said rotor from said nozzle, said outlet passage means being connected at the other end thereof to said main pipe at the other side of said pressure reducing means from said nozzle inlet, said rotor blades being curved in cross section taken in planes perpendicular to their radial extent, the spaces between said blades being of uniform cross-sectional area in planes perpendicular to the flow path therethrough, the curves of the blades providing surfaces adjacent the orifice directed substantially in the direction of the nozzle and surfaces adjacent the outlet passage means directed opposite to said surfaces adjacent the orifice, said outlet passage means including means forming a conical annular space with its base adjacent said rotor blades on said opposite side of the rotor, said means forming a conical annular space including a cover having a conical interior and a conically shaped flow director secured to the end of the rotor shaft coaxial with said shaft and with said conical interior of the cover, the apex of said flow director being rounded, said outlet passage means further including means forming a tubular passage connected to the apex of said conical annular space.

References Cited in the file of this patent

UNITED STATES PATENTS

| | | |
|---|---|---|
| 522,066 | De Laval | June 26, 1894 |
| 1,584,383 | Le Blanc | May 11, 1926 |
| 1,803,220 | Thompson | Apr. 28, 1931 |
| 2,059,518 | Harley | Nov. 3, 1936 |
| 2,204,169 | Zerkowitz | June 11, 1940 |
| 2,233,924 | McKibben | Mar. 4, 1941 |
| 2,276,714 | Brown | Mar. 17, 1942 |
| 2,436,683 | Wood | Feb. 24, 1948 |
| 2,488,729 | Kooyman | Nov. 22, 1949 |
| 2,493,102 | Brainard | Jan. 3, 1950 |
| 2,544,852 | Newton | Mar. 13, 1951 |
| 2,715,814 | Barr | Aug. 23, 1955 |
| 2,803,797 | Cowles | Aug. 20, 1957 |
| 2,811,332 | Buhler | Oct. 29, 1957 |
| 2,935,295 | Lepley | May 3, 1960 |
| 2,939,017 | Teague et al. | May 31, 1960 |
| 2,986,879 | Volk | June 6, 1961 |
| 2,996,445 | Eisenberg | Aug. 15, 1961 |
| 3,019,177 | Anderson | Jan. 30, 1962 |

FOREIGN PATENTS

| | | |
|---|---|---|
| 268,718 | Germany | Aug. 2, 1912 |

UNITED STATES PATENT OFFICE

CERTIFICATE OF CORRECTION

Patent No. 3,140,855                          July 14, 1964

Harley H. Williams et al.

It is hereby certified that error appears in the above numbered patent requiring correction and that the said Letters Patent should read as corrected below.

Column 5, lines 13 to 15, strike out "said outlet passage means being connected at the other end thereof to said main pipe at the other side of said pressure reducing means from said nozzle inlet,".

Signed and sealed this 20th day of April 1965.

(SEAL)
Attest:

ERNEST W. SWIDER
Attesting Officer

EDWARD J. BRENNER
Commissioner of Patents